(12) United States Patent
Krutzler et al.

(10) Patent No.: US 11,252,053 B2
(45) Date of Patent: *Feb. 15, 2022

(54) METHOD AND SYSTEM FOR DELIVERING WEB PAGE CONTENT USING EDGE SERVER

(71) Applicant: VERIZON PATENT AND LICENSING INC., Basking Ridge, NJ (US)

(72) Inventors: Steve Krutzler, Santa Clarita, CA (US); Edward J. Campbell, III, Sunnyvale, CA (US); Shu Kit Chan, Foster City, CA (US); Gamaiel Zavala, Ventura, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/012,893

(22) Filed: Sep. 4, 2020

(65) Prior Publication Data
US 2020/0403885 A1 Dec. 24, 2020

Related U.S. Application Data

(63) Continuation of application No. 14/138,296, filed on Dec. 23, 2013, now Pat. No. 10,771,357.

(51) Int. Cl.
*H04L 12/24* (2006.01)
*H04L 29/08* (2006.01)

(52) U.S. Cl.
CPC ........ *H04L 41/509* (2013.01); *H04L 41/5048* (2013.01); *H04L 67/02* (2013.01); *H04L 67/04* (2013.01); *H04L 67/2847* (2013.01)

(58) Field of Classification Search
CPC .......... G06F 11/00; G06F 12/00; G06F 12/06; G06F 12/14; G06F 12/16; G06F 13/00; G06F 15/16; G06F 15/173; G06F 17/00; G06F 17/30; G06F 23/00; G06N 3/00; G06Q 30/00; H04L 29/00; H04L 67/22
See application file for complete search history.

(56) References Cited

U.S. PATENT DOCUMENTS

| | | |
|---|---|---|
| 5,870,553 A | 2/1999 | Shaw et al. |
| 6,021,426 A | 2/2000 | Douglis et al. |
| 6,178,426 B1 | 1/2001 | Klein et al. |
| 6,189,000 B1 | 2/2001 | Gwertzman et al. |
| 6,601,142 B2 | 7/2003 | Cox et al. |
| 6,871,236 B2 | 3/2005 | Fishman et al. |
| 6,880,123 B1 | 4/2005 | Landsman et al. |
| 7,188,214 B1 | 3/2007 | Kasriel et al. |

(Continued)

*Primary Examiner* — Boris D Grijalva Lobos

(57) ABSTRACT

Methods, systems and programming for delivering web page content using edge server. In one example, a request is received from a user for a page including at least a piece of generic content and a plurality pieces of customized content. The request is forwarded from the user to a content server over the network. The piece of generic content and a first type of instruction are sent to the user. The piece of generic content and the first type of instruction are received from the content server as a response to the forwarded request. Each of the plurality pieces of customized content is sent to the user upon receiving a respective piece of customize content from the content server. The plurality pieces of customized content are to be assembled on the page in accordance with the first type of instruction.

20 Claims, 15 Drawing Sheets

(56) References Cited

U.S. PATENT DOCUMENTS

| | | |
|---|---|---|
| 7,269,784 B1 | 9/2007 | Kasriel et al. |
| 7,788,341 B1 | 8/2010 | Burns |
| 8,191,082 B2 | 5/2012 | Ramanathan et al. |
| 8,281,077 B2 | 10/2012 | Hyatt |
| 8,306,858 B2 | 11/2012 | Lisbakken |
| 8,346,860 B2 | 1/2013 | Berg et al. |
| 8,352,282 B2 | 1/2013 | Jensen et al. |
| 8,370,732 B2 | 2/2013 | Black et al. |
| 8,443,056 B2 | 5/2013 | Hunt |
| 8,478,843 B1 | 7/2013 | Ortlieb et al. |
| 8,539,104 B2 | 9/2013 | Shenfield |
| 8,539,338 B2 | 9/2013 | Zhu et al. |
| 8,606,996 B2 | 12/2013 | Richardson et al. |
| 8,713,093 B1 | 4/2014 | Upadhyay et al. |
| 8,893,014 B1 | 11/2014 | Au et al. |
| 8,914,881 B2 | 12/2014 | Lekies et al. |
| 8,935,609 B2 | 1/2015 | Bauchot et al. |
| 9,549,039 B2 | 1/2017 | Alstad et al. |
| 9,621,928 B2 | 4/2017 | Manzari et al. |
| 10,157,236 B2 | 12/2018 | Alstad |
| 2001/0037400 A1 | 11/2001 | Raz et al. |
| 2002/0007392 A1 | 1/2002 | Buddhikot et al. |
| 2002/0055966 A1 | 5/2002 | Border et al. |
| 2002/0091741 A1 | 7/2002 | Ferreira et al. |
| 2003/0009563 A1 | 1/2003 | Douglis et al. |
| 2004/0138948 A1 | 7/2004 | Loomis |
| 2004/0205165 A1 | 10/2004 | Melamed et al. |
| 2005/0108517 A1 | 5/2005 | Dillon et al. |
| 2005/0262006 A1 | 11/2005 | Beartusk et al. |
| 2006/0091203 A1 | 5/2006 | Bakker et al. |
| 2006/0095422 A1 | 5/2006 | Kikuchi |
| 2007/0088805 A1 | 4/2007 | Cyster |
| 2007/0143672 A1 | 6/2007 | Lipton et al. |
| 2007/0220599 A1 | 9/2007 | Moen et al. |
| 2008/0215437 A1 | 9/2008 | Levy et al. |
| 2008/0215718 A1 | 9/2008 | Stolorz et al. |
| 2009/0006210 A1 | 1/2009 | Cho |
| 2009/0254707 A1 | 10/2009 | Alstad |
| 2009/0299857 A1 | 12/2009 | Brubaker |
| 2010/0121712 A1 | 5/2010 | Shahshahani et al. |
| 2010/0312624 A1 | 12/2010 | Bilenko |
| 2011/0071894 A1 | 3/2011 | Nesamoney et al. |
| 2012/0158815 A1 | 6/2012 | Kelly et al. |
| 2012/0197982 A1 | 8/2012 | Waher |
| 2012/0209670 A1 | 8/2012 | Zealer |
| 2012/0323878 A1 | 12/2012 | Jing et al. |
| 2013/0061296 A1 | 3/2013 | Reddy et al. |
| 2013/0254308 A1 | 9/2013 | Rose et al. |
| 2013/0254342 A1 | 9/2013 | Chan |
| 2014/0095320 A1 | 4/2014 | Sivaramakrishnan et al. |

METHOD AND SYSTEM FOR DELIVERING WEB PAGE CONTENT USING EDGE SERVER

CROSS-REFERENCE TO RELATED APPLICATION

The present application is a continuation of U.S. patent application Ser. No. 14/138,296, filed Dec. 23, 2013, which is incorporated herein by reference in its entirety.

BACKGROUND

1. Technical Field

The present teaching relates to methods, systems, and programming for Internet services. Particularly, the present teaching is directed to methods, systems, and programming for delivering web page content.

2. Discussion of Technical Background

A content delivery network is a large distributed system of servers deployed in multiple data centers across the Internet. The goal of a content delivery network is to serve content to end-users with high availability and high performance. Content delivery networks serve a large fraction of the Internet content today, including web objects (text, graphics and scripts), downloadable objects (media files, software, documents), applications (e-commerce, portals), live streaming media, on-demand streaming media, and social networks.

More and more web pages today are personalized or customized based on the characteristics (interests, social category, context, etc.) of an individual. Personalization is the process of tailoring content to individual user's implicit behavior and explicit preferences. Web personalization is delivering different and unique content to each individual user based on the user's interests. However, a large part of latency for rendering web pages arises from the heavy computation operations related to web page content personalization, such as generating and assembling content personalized/customized to user preferences.

Moreover, occasionally, servers may stop serving content because of, for example, erroneous code pushes, editorial mistakes, or capacity overload. These stoppages give users a bad experience because users are either shown a standard error page with little information that is helpful to the user, or the software that the user using stops working or freezes. Such experiences cause users to become frustrated and migrate to alternative servers of content.

Therefore, there is a need to provide an improved solution for delivering web pages to solve the above-mentioned problems.

SUMMARY

The present teaching relates to methods, systems, and programming for Internet services. Particularly, the present teaching is directed to methods, systems, and programming for delivering web page content.

In one example, a method, implemented on at least one machine each having at least one processor, storage, and a communication platform connected to a network for content delivery is presented. A request is received from a user for a page including at least a piece of generic content and a plurality pieces of customized content. The request is forwarded from the user to a content server over the network. The piece of generic content and a first type of instruction are sent to the user. The piece of generic content and the first type of instruction are received from the content server as a response to the forwarded request. Each of the plurality pieces of customized content is sent to the user upon receiving a respective piece of customize content from the content server. The plurality pieces of customized content are to be assembled on the page in accordance with the first type of instruction.

In another example, a method, implemented on at least one machine each having at least one processor, storage, and a communication platform connected to a network for content delivery is presented. A request is received, over the network, from an edge server for a page including at least a piece of generic content and a plurality pieces of customized content. The piece of generic content is obtained. The piece of generic content and a first type of instruction are sent to the edge server. The plurality pieces of customized content are obtained. Each of the plurality pieces of customized content is sent to the edge server upon obtaining a respective piece of customized content. The plurality pieces of customized content are to be assembled on the page in accordance with the first type of instruction.

In a different example, a system having at least one processor, storage, and a communication platform for content delivery is presented. The system includes a control unit, a content requesting unit, and a content delivering unit. The control unit is implemented on the at least one processor and configured to receive a request from a user for a page including at least a piece of generic content and a plurality pieces of customized content. The content requesting unit is implemented on the at least one processor and configured to forward the request from the user to a content server over the network. The content delivering unit is implemented on the at least one processor and configured to send the piece of generic content and a first type of instruction to the user. The piece of generic content and the first type of instruction are received from the content server as a response to the forwarded request. The content delivering unit is further configured to send each of the plurality pieces of customized content to the user upon receiving a respective piece of customize content from the content server. The plurality pieces of customized content are to be assembled on the page in accordance with the first type of instruction.

Other concepts relate to software for content delivery. A software product, in accord with this concept, includes at least one non-transitory machine-readable medium and information carried by the medium. The information carried by the medium may be executable program code data regarding parameters in association with a request or operational parameters, such as information related to a user, a request, or a social group, etc.

In one example, a non-transitory machine readable medium having information recorded thereon for content delivery is presented. The recorded information, when read by the machine, causes the machine to perform a series of steps. A request is received from a user for a page including at least a piece of generic content and a plurality pieces of customized content. The request is forwarded from the user to a content server over the network. The piece of generic content and a first type of instruction are sent to the user. The piece of generic content and the first type of instruction are received from the content server as a response to the forwarded request. Each of the plurality pieces of customized content is sent to the user upon receiving a respective piece of customize content from the content server. The plurality pieces of customized content are to be assembled on the page in accordance with the first type of instruction.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
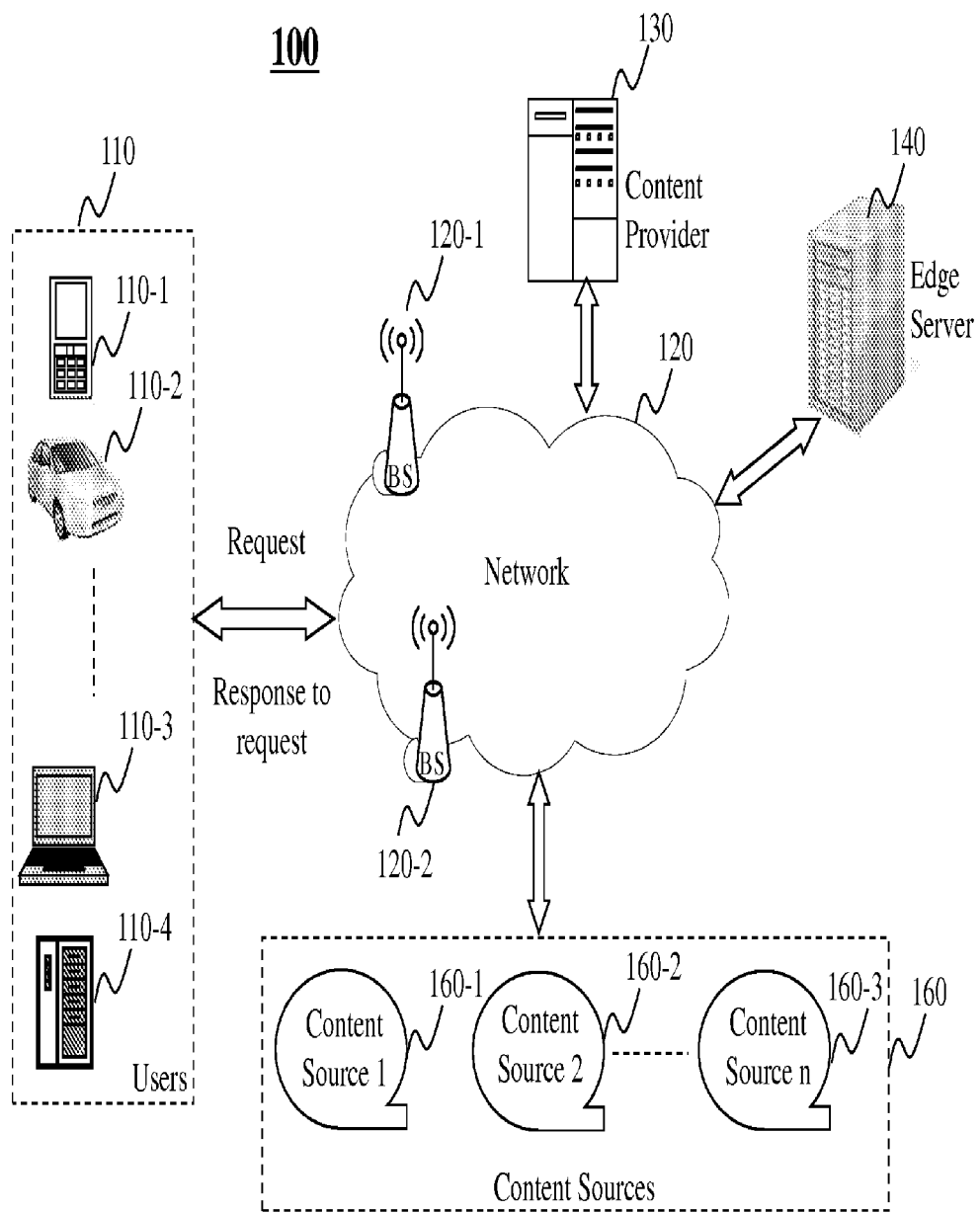
FIG. 1 is an exemplary embodiment of a networked environment in which pipelined content delivery is deployed, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The present teaching describes method, system, and programming aspects of efficient and effective web content delivery. The method and system as disclosed herein aim at improving end-users' experience of viewing web pages with heavy personalized/customized content by reducing latency for rendering web pages and improving content availability. The method and system improve performance of web pages for end-users by separating web pages into components that can be cached for all users (e.g., generic content), and those that cannot (e.g., personalized/customized content), and serve them in a streamlined manner. This allows responses to be sent to users faster than with a traditional web serving architecture. The method and system defer loading of more heavy-weight processing of personalized/customized components of a web page so that the user experience can begin rendering before they are complete. The modular web page serving architecture disclosed in the present teaching also improves the latency of the first-byte to users because heavy computation operations (e.g. personalized/customized components) can begin executing much earlier in the request flow than is typical with the current media serving stack. The rendering can begin much sooner because heavy computation portions are asynchronous and not blocking the cached portions, which can stream to the user much sooner than in a traditional architecture. Moreover, the method and system provide a fallback mechanism to serve good experiences in the event of failure of content servers in data centers. For example, fallback mechanism is available by default without any manual intervention during the event of server failure, because, instead of waiting for a problem to occur and then asking servers to return simplified responses, fully usable web pages are cached by default and kept fresh so that any availability problem with content servers will trigger serving of the generic fallback to maintain a high quality experience for users.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is an exemplary embodiment of a networked environment in which pipelined content delivery is deployed, according to an embodiment of the present teaching. The exemplary networked environment 100 includes users 110, a network 120, a content provider 130, an edge server 140, and content sources 160. The network 120 can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. A network 120 may also include various network access points, e.g., wired or wireless access points such as base stations or Internet exchange points 120-1, . . . , 120-2. Using the wired or wireless access points a data source may connect to the network 120 in order to transmit information via the network 120.

Users 110 may be of different types such as users connected to the network via desktop connections (110-4), users connecting to the network via wireless connections such as through a laptop (110-3), a handheld device (110-1), or a built-in device in a motor vehicle (110-2). A user 110 may send a request to the content provider 130, e.g., a data center, via the network 120 and the edge server 140, and receive a request result from the content provider 130 and/or the edge server 140 through the network 120. The request result may be provided directly by the content provider 130 or obtained by the content provider 130 from any one of a number of content sources 160. The content sources 160 include multiple content sources 160-1, 160-2, . . . , 160-3. A content source 160 may correspond to a web page host corresponding to an entity. The web page host may be an individual, a business, or an organization such as USPTO.gov, a content provider such as cnn.com and Yahoo.com, or a content feed source such as Twitter or blogs. Both the content provider 130 and the edge server 140 may access information from any of the content sources 160-1, 160-2, . . . , 160-3. The content provider 130 may rely on such information to respond to a request (e.g., the content provider 130 provides web content corresponding to the request and returns the web content to a user 110 via the edge server 140). The edge server 140 may be, for example, a caching proxy server, located near the user 110 accessing the data and used to improve content delivery latency and/or lessening the load on content provider 130. The edge server 140 provides pipelined web content delivery services to the users 110.

In the exemplary networked environment 100, a user 110 may initially send a request for a web page to the edge server 140 via the network 120. The request is forwarded to the content provider 130 via the network 120. The content provider 130 provides the requested content to the edge server 140 via the network 120. The edge server 140 forwards the requested content to the user 110 via the network 120. A modular web page serving architecture is employed by the content provider 130 and the edge server 140 in this embodiment. For example, when a user request comes to the edge server 140, the edge server 140 fetches an HTML document containing a page template and generic content (un-personalized portions such as an article body) from the content provider 130, which are cached by the edge server 140 that is closer to the user 110 than the content provider 130 and then streamed to the user 110 without waiting for the content provider 130 to completely build the whole page. By abstracting portions of web pages into content items (e.g., HTML fragments), the edge server 140 is able to fetch personalized/customized content items independently and reduce start-up time of a full-page assembly on the content provider 130. These content items are then served in a format for use by an instruction (e.g., JavaScript embedded in the generic content) in the browser, so that as they are streamed to the user 110, the instruction can assemble each content item into its appropriate place in the web page for rendering.

If the content provider 130 fails to provide one of the personalized/customized content items requested by the edge server 140, then the edge server 140 substitutes cached generic content corresponding to the request, which is a fallback version of the unavailable personalized/customized content item, and provides the cached generic content to the user 110. The fallback generic content item is cached by the edge server 140 in response to previous requests by users 110. Thus, more popular content is more likely to be cached. The above edge server 140 allows a service engineer more flexibility to correct issues with the content provider 130 when those issues occur.

"Generic content" referred in the present teaching includes any content that is not specific to an individual. The generic content is sometimes known as "static content," as opposed to "dynamic content," "customized content," or "personalized content." It is noted that the terms "dynamic content," "personalized content," and "customized content" are used interchangeably in the present teaching, which include any types of content (e.g., articles, news, advertisements, blogs and microblogs, comments, etc.) in any format (e.g., text, images, video clips, audios, animations, scripts, etc., or any combination thereof) that is relevant to an individual's characteristics and based on the individual's implicit information and/or explicit information. The explicit information includes, for example, a user's declared personal information such as gender or date of birth and declared interests or preference. The implicit information includes, for example, a user's activities and content consumption preference in the past. The explicit and implicit information may also include information related to a user's device (e.g., device type, brand, ID, specification), a user's web browser (e.g., browser type, version, supporting language, encoding, etc.), a user's location, etc.

Figure 2:
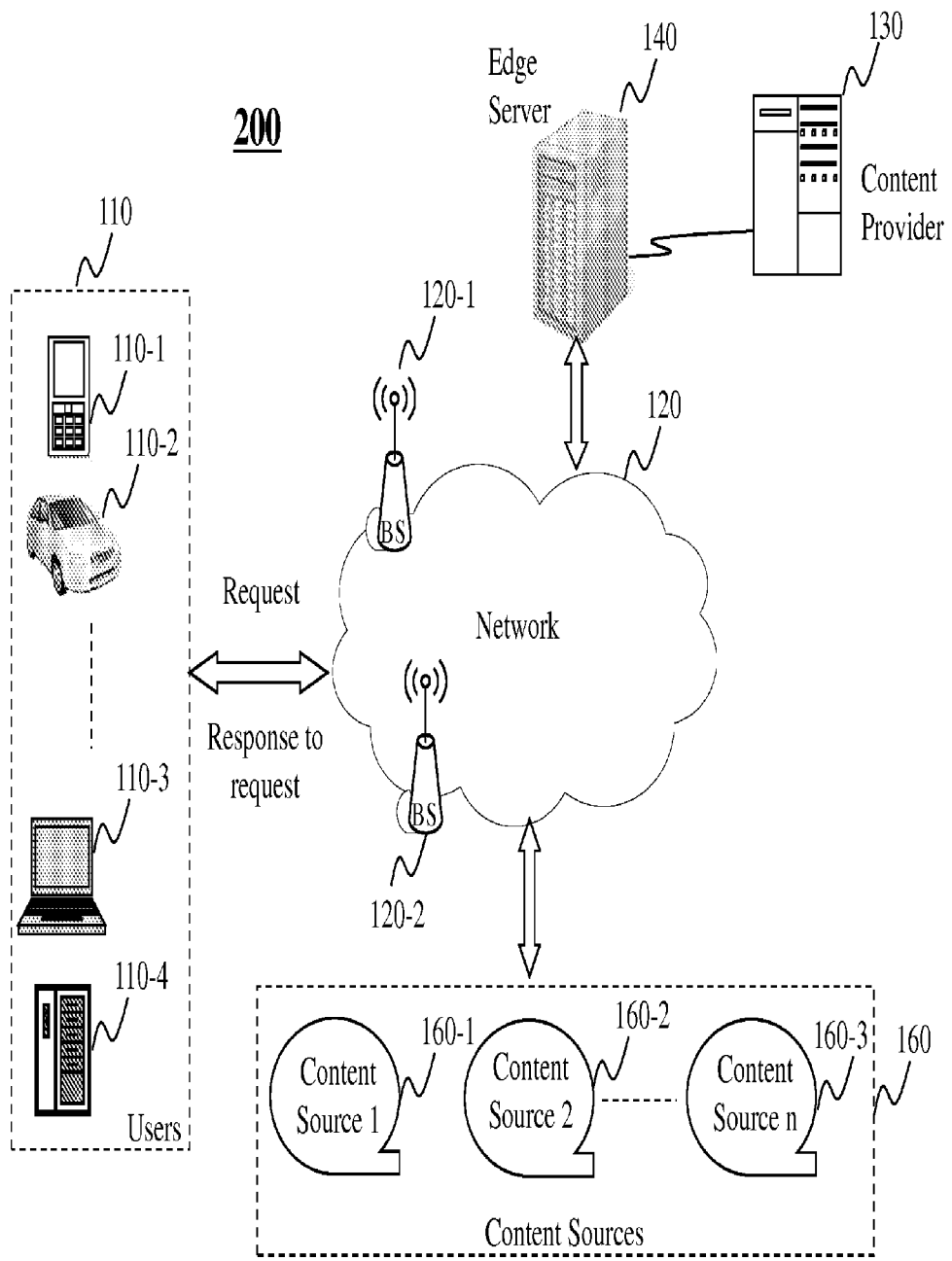
FIG. 2 is another exemplary embodiment of a networked environment in which pipelined content delivery is deployed, according to an embodiment of the present teaching.

FIG. 2 presents a similar networked environment as what is shown in FIG. 1 except that the edge server 140 serves as a front end system of the content provider 130. In this networked environment 200, all requests are sent to the edge server 140, which forwards the requests to the content provider 130 to process them. The content provider 130 provides the requested content to the edge server 140. The edge server 140 forwards the requested content items in a streamlined manner to the user 110 via the network 120. If the content provider 130 fails to provide a customized content item requested to the edge server 140, then the edge server 140 substitutes cached generic content corresponding to the request and provide the cached generic content to the user 110 as a fallback version.

Figure 3:
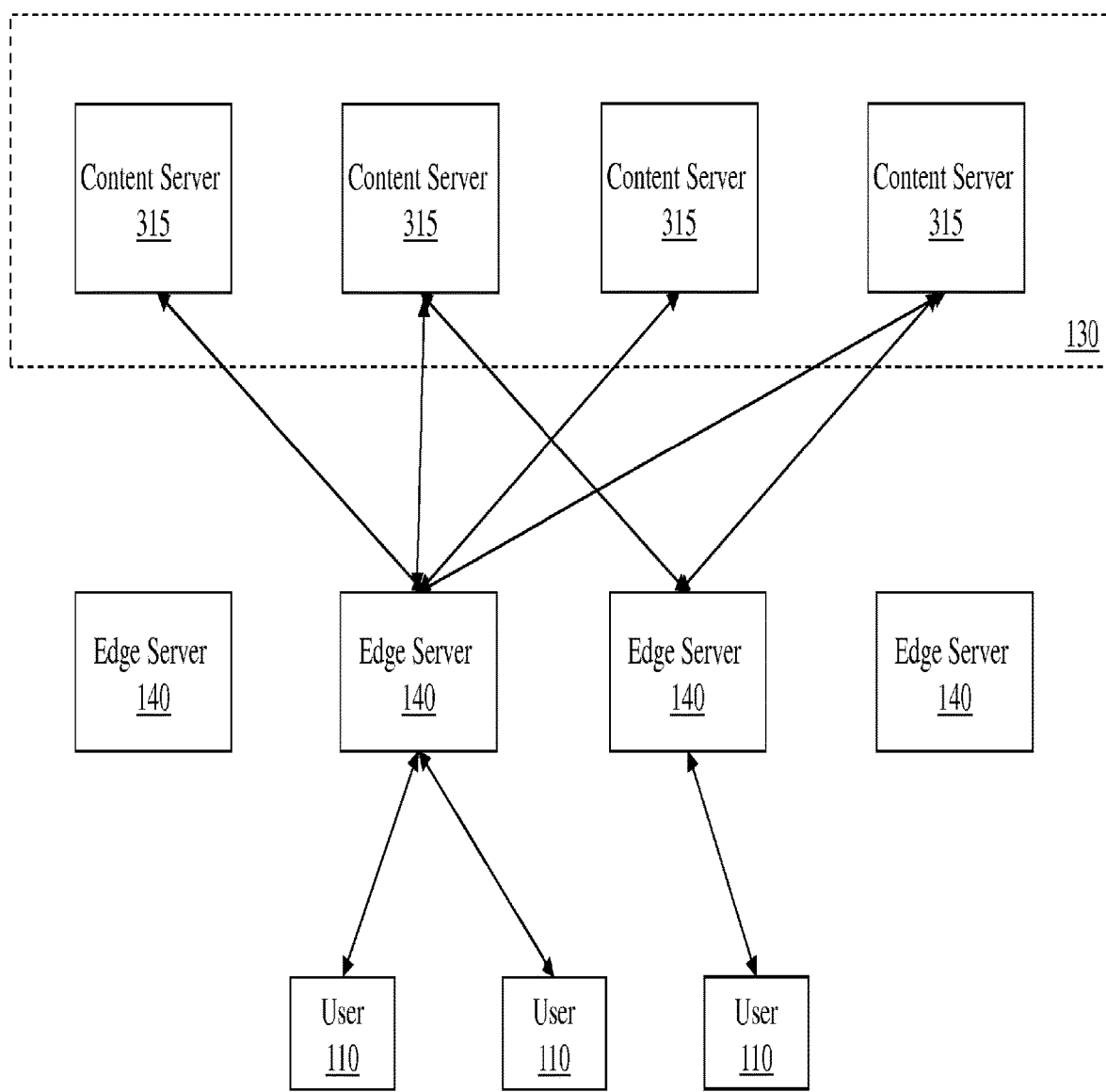
FIG. 3 is an exemplary content delivery network in which multiple edge servers and content servers are deployed, according to an embodiment of the present teaching.

FIG. 3 is an exemplary content delivery network in which multiple edge servers and content servers are deployed, according to an embodiment of the present teaching. The content delivery network 300 is arranged hierarchically depending upon function. Edge servers 140 are geographically closer to users 110 compared with content servers 315 in the content provider 130 and provide an interface to the users 110. There may be any number of edge servers 140, and a user 110 may connect to any one of the edge servers 140, which is close to where the user 110 locates, to request content. The corresponding edge server 140 to serve a particular user 110 may be selected by a domain name system (DNS) server (not shown) based on the user's 110 IP address. The edge servers 140 in turn contact content servers 315 of the content provider 130. The content servers 315 may each correspond to a different type of content. For example, one of the content servers 315 may be a mail server, another of the content servers 315 may provide news, and yet another of the content servers 315 may provide social networking. The edge servers 140 are adapted to forward content requests to the appropriate content server 315, which may in turn contact backend servers for raw data.

The edge servers 140 in the exemplary content delivery network 300 are able to break web pages into modules that can be rendered independently using any suitable instruction sets, for example, an http specification such as Edge Side Includes (ESI). This also allows the content delivery network 300 to leverage multiple content servers 315 to compute the full web page instead of the typical single content server that computes the entire web page, which can lead to potential server capacity efficiencies. In addition, fallback mechanism is available by default in the content delivery network 300 without any manual intervention during the event of server failure because generic content items in web pages are cached by default as fallback versions of corresponding customized content items and kept fresh so that any availability problem with content servers 315 will trigger serving of the generic fallback to maintain a high quality experience for users.

Figure 4:
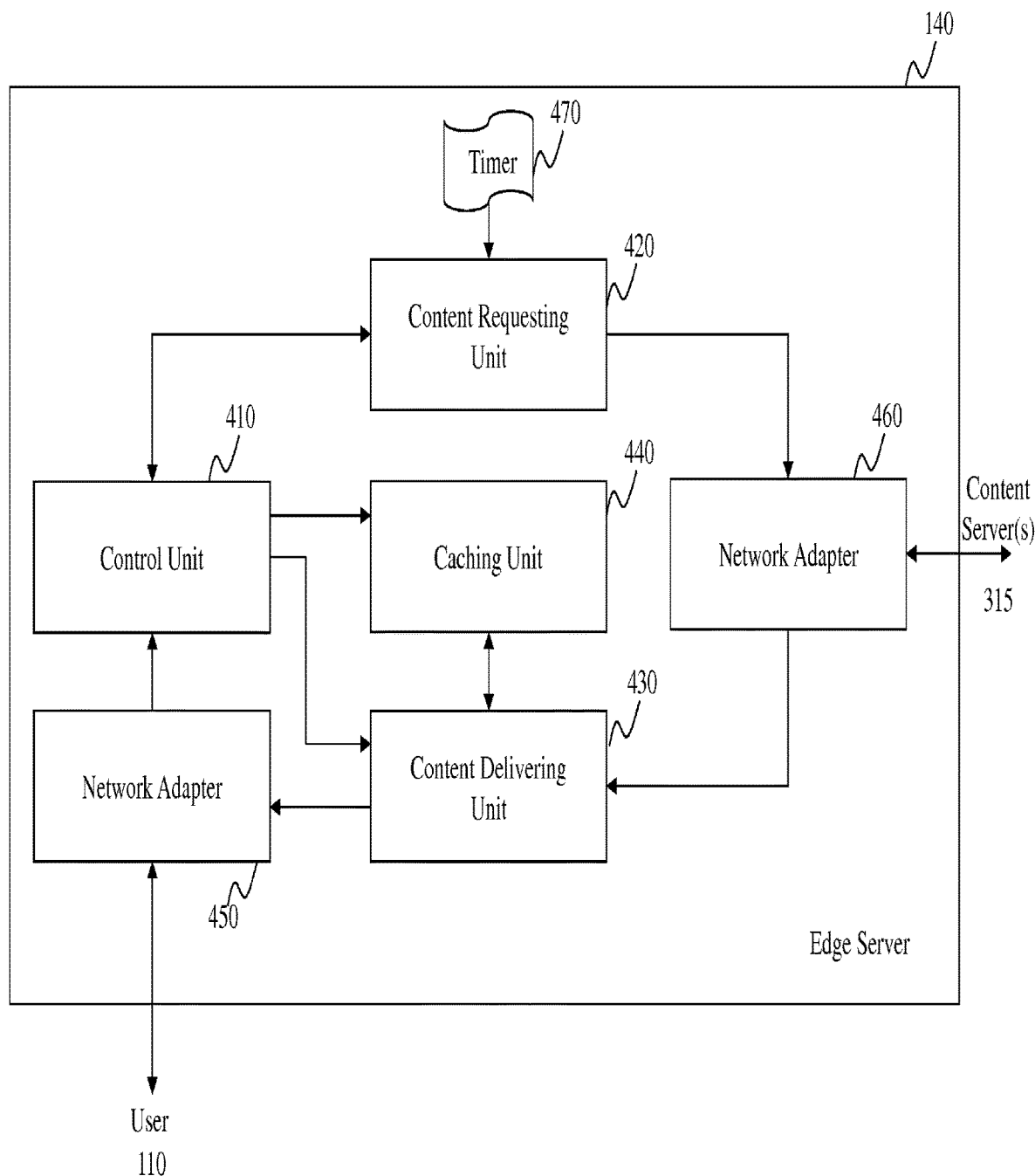
FIG. 4 is an exemplary functional block diagram of an edge server, according to an embodiment of the present teaching.

FIG. 4 is an exemplary functional block diagram of an edge server, according to an embodiment of the present teaching. The edge server 140 includes a control unit 410, a content requesting unit 420, a content delivering unit 430, a caching unit 440, and one or more network adapters 450, 460. The network adapters 450, 460 enable the edge server 140 to communicate with users 110 and content servers 315, via network connection. The network adapter 450 receives a request for a web page including both generic and customized content from a user 110 and sends generic and customized content items individually to the user 110 in a streamline fashion. The network adapter 460 forwards requests for content to the corresponding content servers 315 and receives content produced by the content servers 315.

The control unit 410 is configured to separate the web page in the request into individual components, including at least one generic content item and multiple customized content items. In one example, the page compartmentalization is performed by the control unit 410 using instructions, such as ESI. An HTML document may be partitioned into an application canvas (page template), un-personalized portions (such as an article body), and personalized portions (such as "recommended products," "news for you," etc.), each of which is an HTML fragment. The content requesting unit 420 is responsible for requesting each of the content items from the respective content server 315 through the network adapter 460. That is, the request for a web page provided by the content requesting unit 420 includes information indicating how each of the content items on a web page is compartmented and the nature of each content item (e.g., a generic or customized content item). The content requesting unit 420 may be coupled with a timer 470. The timer 470 causes the content requesting unit 420 to assume that a requested content item will not be delivered when the timer 470 has expired for the requested content item.

Information regarding how each of the content items on the web page is compartmented and the nature of each content item is also provided by the control unit 410 to the content delivering unit 430. The content delivering unit 430 delivers each content item and other data, such as page template and instruction on how to assemble customized content items on the client-side, to the user 110 once they become available. For example, generic content item and page template are usually received earlier than the customized content items from the content servers 315 as they are immediately available at the content servers 315. A set of instructions may be received along with the generic content item from the content servers 315. The set of instructions include a first type of instruction that indicates how each of the later received customized content items shall be assembled on the web page. The first type of instruction may be a script, such as a JavaScript embedded in the generic content. The set of instructions also include a second type of instruction that instructs the edge server 140 to fetch the customized content items and also indicate the corresponding fallback versions (e.g., a cached generic content item) for each of the later fetched customized content items when they become unavailable. The second type of instruction may be an http specification, such as ESI embedded in the generic content. It is noted that different from the first type of instruction to be executed at the client-side, the second type of instruction does not need to be delivered to the user 110 as it relates to content fetching by the edge sever 140. In this embodiment, each of the received generic content items is cached by the caching unit 440. As a result, before controlling the content requesting unit 420 to request for a generic content item, the control unit 410 may first check the caching unit 440 to see whether and when the generic content item has been cached. If the unexpired generic content item is in the caching unit 440, then instead of fetching it from the content servers 315, the content delivering unit 430 retrieves it directly from the caching unit 440 to improve latency. As to the customized items, the content delivering unit 430 streams asynchronized customized items to the user 110 as soon as they are received from the content servers 315. In other words, the customized items are delivered to the user 110 by the content delivering unit 430 in a "first-come, first-served" manner without a specific order. In one example, the edge server 140 is able to fetch those customized items independently and reduce start-up time of a full-page assembly on the content servers 315. These fragments are then served in a format for use by JavaScript in the browser, so that as they are streamed to the user 110, JavaScript can assemble each fragment into its appropriate place on the web page.

Figure 5:
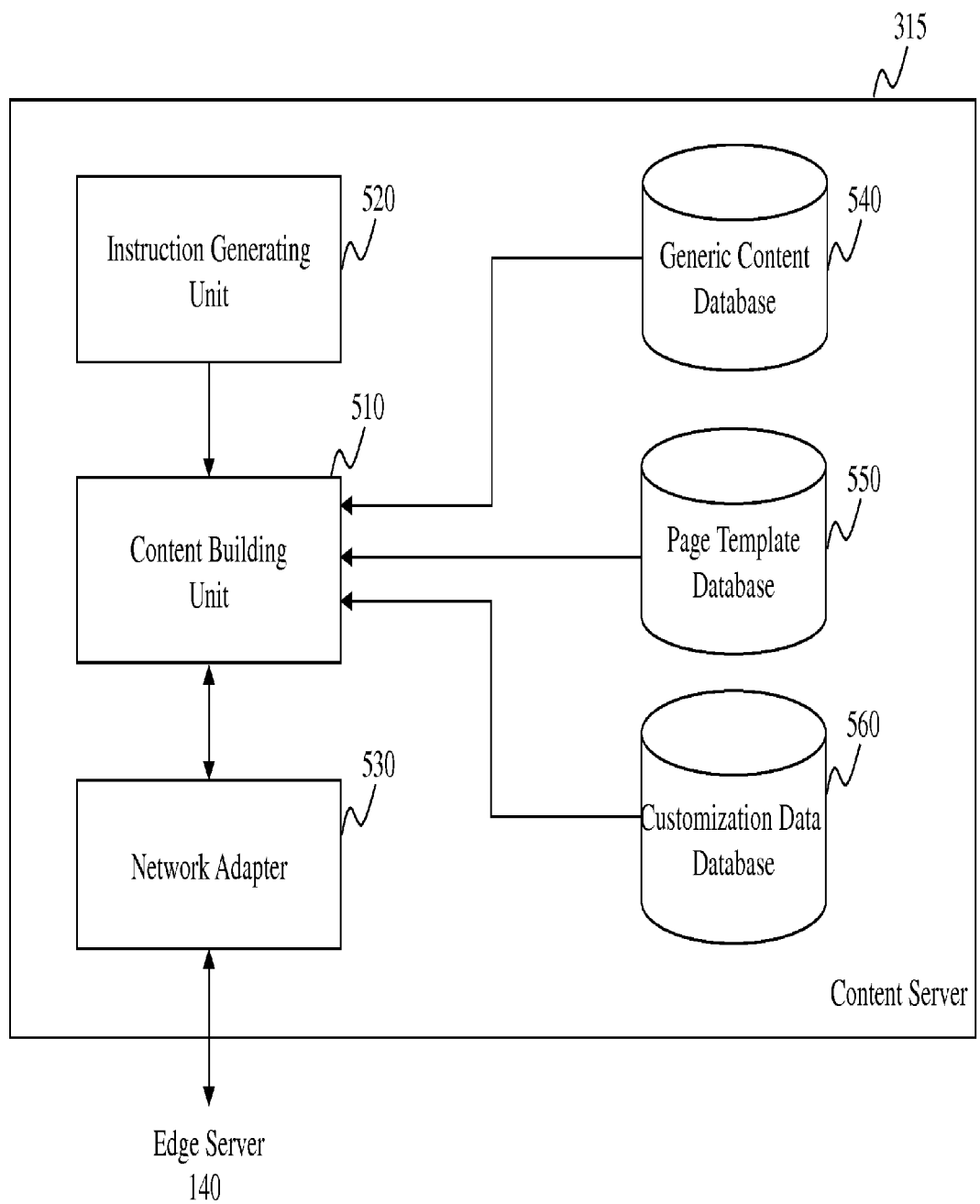
FIG. 5 is an exemplary functional block diagram of a content server, according to an embodiment of the present teaching.

FIG. 5 is an exemplary functional block diagram of a content server, according to an embodiment of the present teaching. The content server 315 includes a content building unit 510, an instruction generating unit 520, and a network adapter 530. The network adapter 530 enables communication with edge servers 140. Requests from edge servers 140 are received by the network adapter 530 and forwarded to the content building unit 510. The content building unit 510 obtains generic content from a generic content database 540 and obtains page templates from a page template database 550 according to the request. The generic content database 540 stores predetermined generic content specified by the operator of the content provider. The page template database 550 stores layouts of each web page. The generic content item and page template are sent to the edge servers 140 through the network adapter 530 without waiting for the customized content items.

The content building unit 510 obtains corresponding customization data from customization database 560 for each customized content item. The content building unit 510 is response for building each customized content item using the customization data based on a particular user's characterizes as described before. For example, "today's weather" is a customized content item built based on the user's location. In another example, the content building unit 510 builds "top news for you" based on the user's declared or inferred interests. It is noted that the request may include multiple customized content items on the same web page, and thus one or more content building units 510 build those content items in parallel without any particular order. As soon as any one of the customized content items is ready, the content building unit 510 sends it to the edge server 140. In other words, content building unit 510 streams asynchronized customized items to the edge server 140 as soon as they are ready.

In instruction generating unit 520 is configured to generate a set of instructions based on the content items in the request. In this example, the set of instructions are generated using an http specification, such as ESI, and script language, such as JavaScript. The first type of instruction instructs how each customized content item is to be assembled on the web page at the client-side. In addition, the second type of instruction instructs the edge server 140 on what customized content items to fetch and also indicates a corresponding fallback version (e.g., a cached generic content item) for each customized content item. For example, the fallback version of "top news for you" may be indicated by the instruction as the most-recent political news that has been cached. The generated first and second types of instructions are sent to the edge server 140 along with the generic content.

Figure 6:
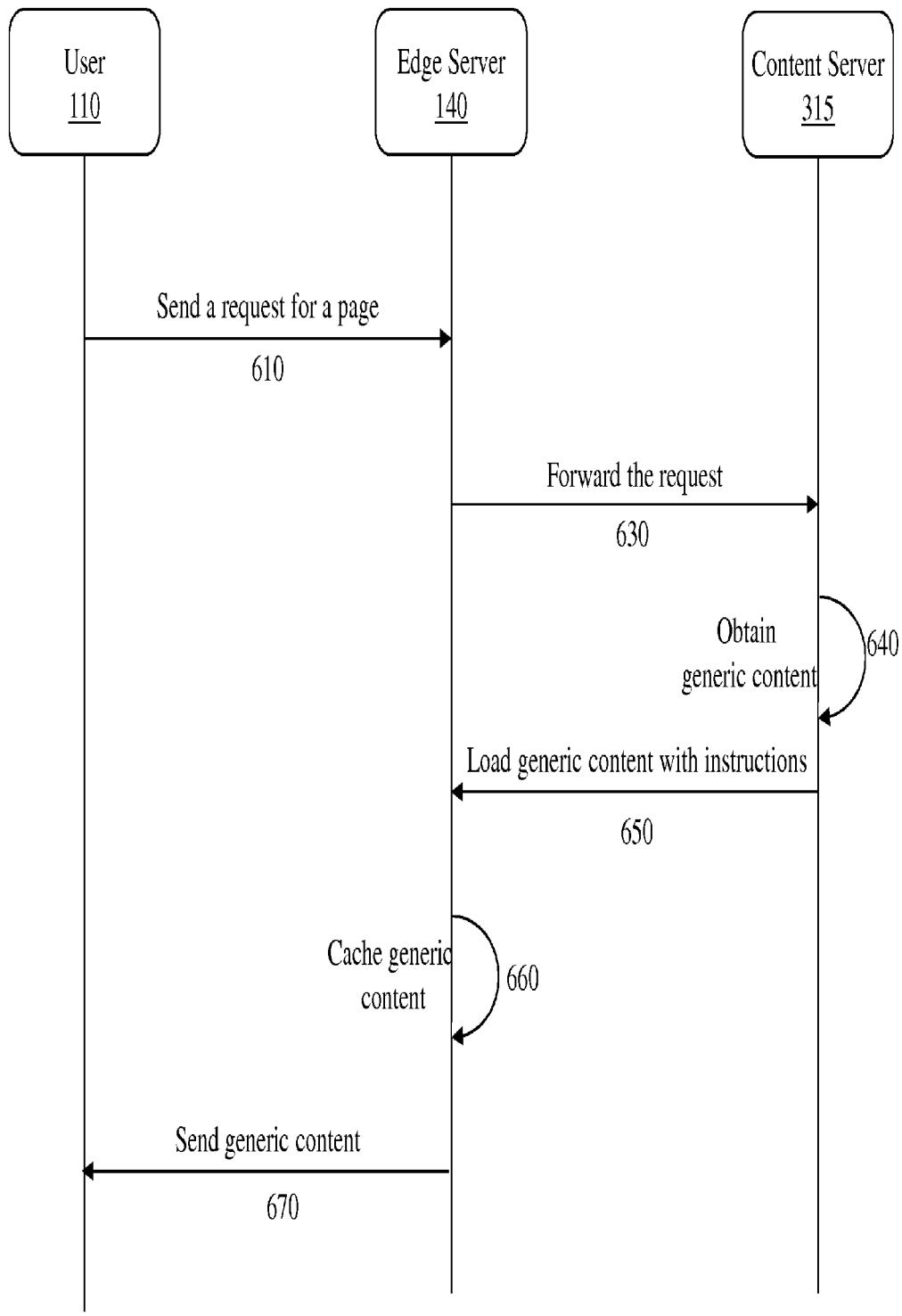
FIGS. 6-8 are time-line charts for an exemplary pipelined content delivery process, according to an embodiment of the present teaching.
Figure 7:
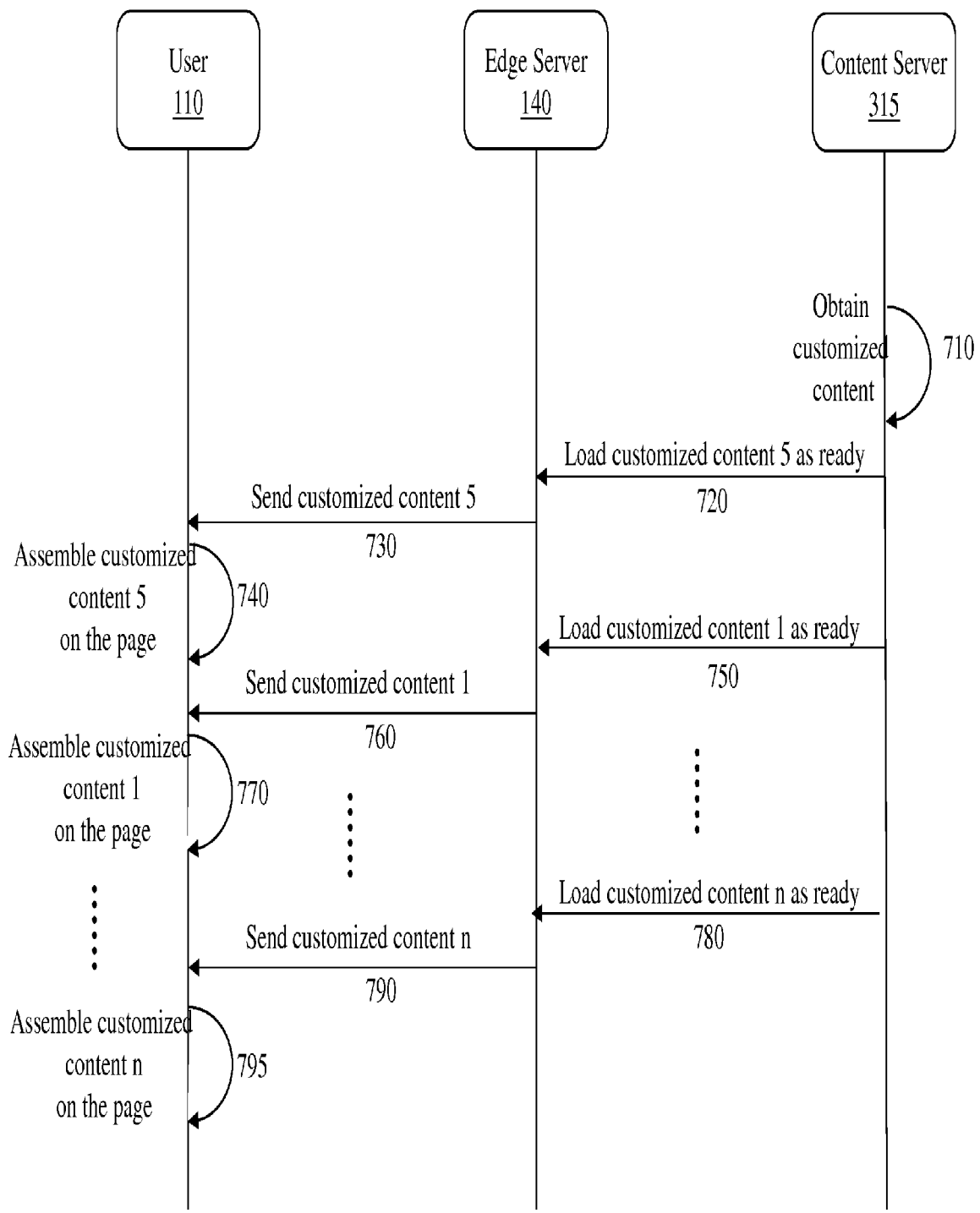
Figure 8:
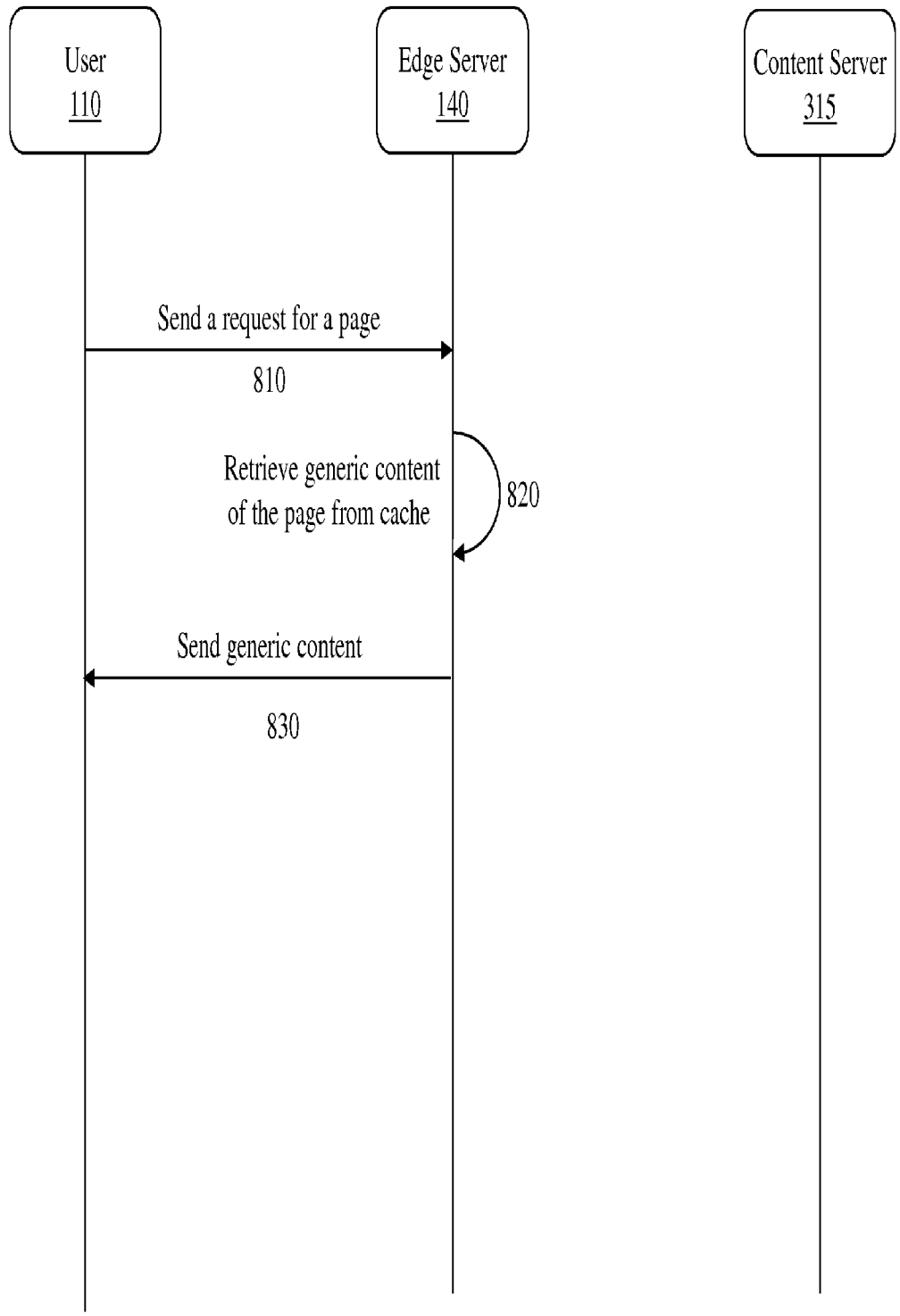

FIGS. 6-8 are time-line charts for an exemplary pipelined content delivery process, according to an embodiment of the present teaching. At time 610, a user 110 sends a web page request including generic and customized content items to an edge server 140 that is close to the user 110. The request may include information associated with the user, such as cookies that identify the user 110, a user agent that identifies a browser type of the user 110, the device used by the user 110, the language of the user 110, etc. The request is then forwarded to one or more content servers 315 based on the requested content items at time 630. The content server 315, at time 640, obtains the requested generic content. The generic content, along with a set of instructions and a page template, are loaded onto the edge server 140 at time 650. At time 660, the generic content is cached at the edge server 140. At time 670, the generic content, along with the first type of instruction and page template, are sent by the edge server 140 to the user 110. It is noted that the first type of instruction that instructs how each customized content item is to be assembled on the web page at the client-side is sent to the user 110, while the second type of instruction is not sent to the user 110 as it instructs the edge server 140 on content fetching.

Moving to FIG. 7, at time 710, the content server 315 obtains customized content items in parallel. At time 720, the first customized content item (5) becomes ready and is loaded onto the edge server 140. The edge server 140 then sends the customized content item (5) to the user 110 at time 730. At time 740, the customized content item (5) is assembled on the web page at the client-side in accordance with the previously received first type of instruction. At time 750, another customized content item (1) becomes ready at the content server 315 and is loaded onto the edge server 140. The edge server 140 sends the customized content item (1) to the user 110 at time 760. At time 770, the customized content item (1) is assembled on the web page in accordance with the previously received first type of instruction. Similarly, at time 780, the last customized content item (n) is ready and loaded onto the edge server 140. At time 790, the edge server 140 sends the customized content item (n) to the user 110. Eventually, at time 795, all the customized content items are assembled onto the web page.

In one embodiment, at time 810, a request for a web page is sent by the user 110 to the edge server 140. The generic content item on the web page may have been recently cached at the edge server 140. In this situation, at time 820, instead of requesting the generic content from the content server 315, the edge server 140 retrieves the cached generic content to reduce latency. The edge server 140 then sends the cached generic content to the user 110. In another situation where one of the customized content items become unavailable, at time 820, the edge server 140 retrieves a cached generic content as a fallback version for replacing the unavailable customized content item in accordance with the second type of instruction previously received from the content server 315. At time 830, the fallback generic content is sent to the user 110 in replace of the unavailable customized content.

Figure 9:
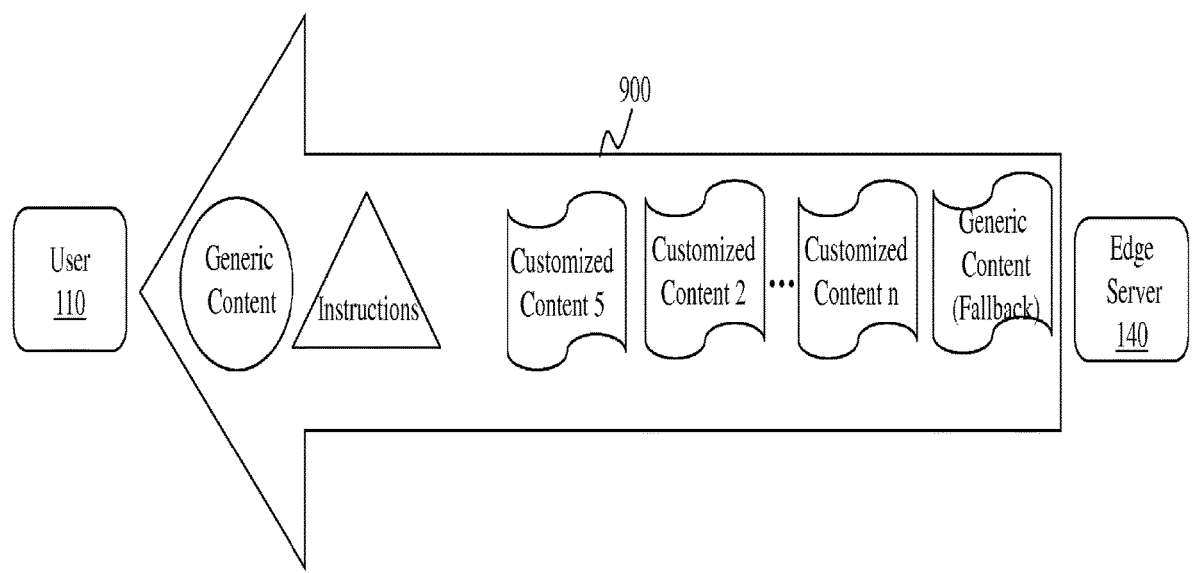
FIG. 9 depicts an exemplary "pipeline" for delivering web content from an edge server to a user.

FIG. 9 depicts an exemplary "pipeline" for delivering web content from an edge server to a user. As described before, components of a web page are sent to the user 110 from the edge server 140 individually in a streamline. That is, a "pipeline" 900 is established between the edge server 140 and the user 110 for streaming web page components, which are to be assembled together at the client-side. As shown in FIG. 9, the generic content along with the first type of instruction are first delivered to the user 110 through the pipeline 900. After that, all the customized content items are streamed in a "first-come, first-served" manner through the pipeline 900. Additional generic content items may be further delivered through the pipeline 900 as fallback versions for any unavailable customized content items. As a result, the latency for rendering the web page is improved due to the compartmentalization and pipelining.

Figure 10:
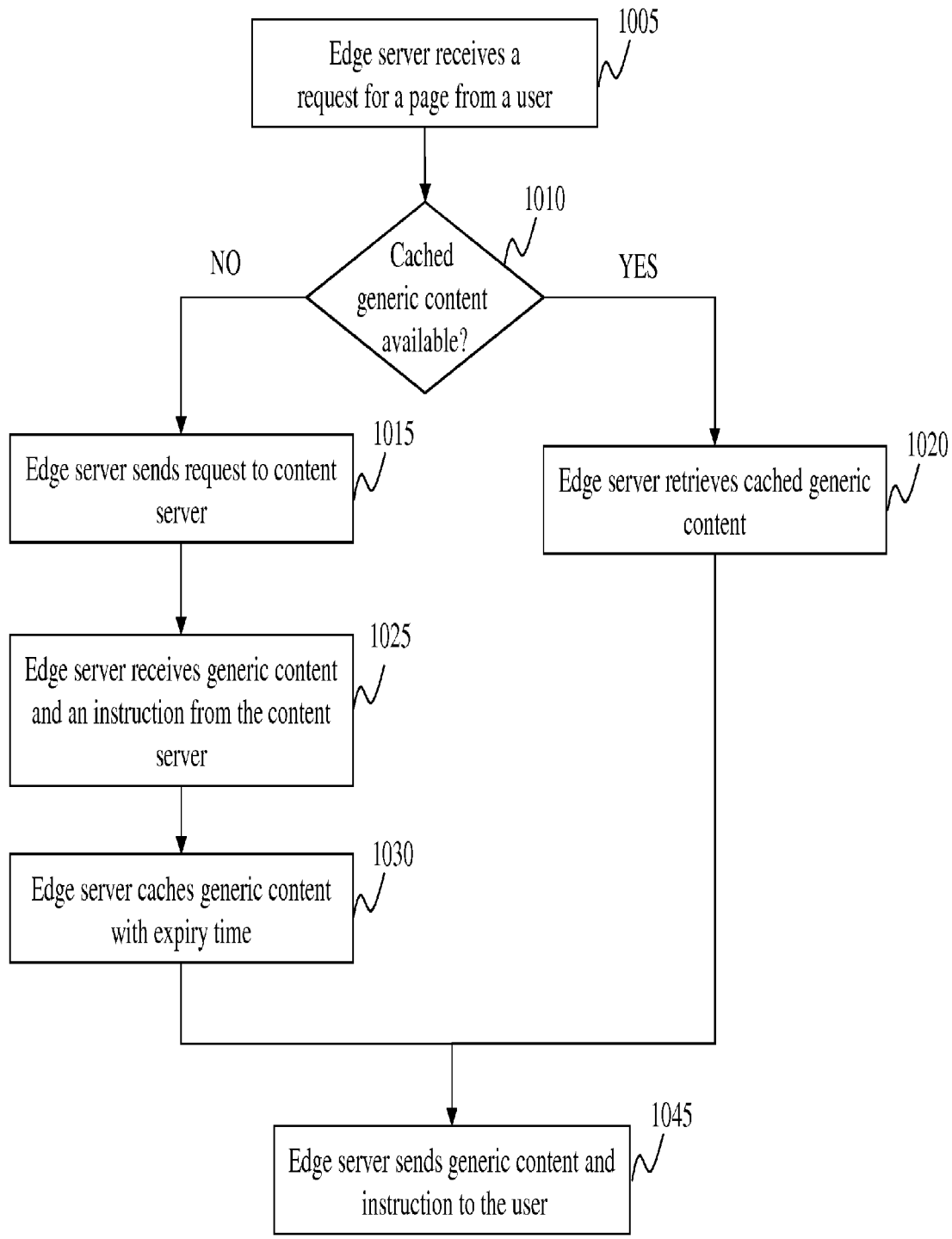
FIGS. 10-11 are flow charts for an exemplary process of delivering content to a user by an edge server, according to an embodiment of the present teaching.
Figure 11:
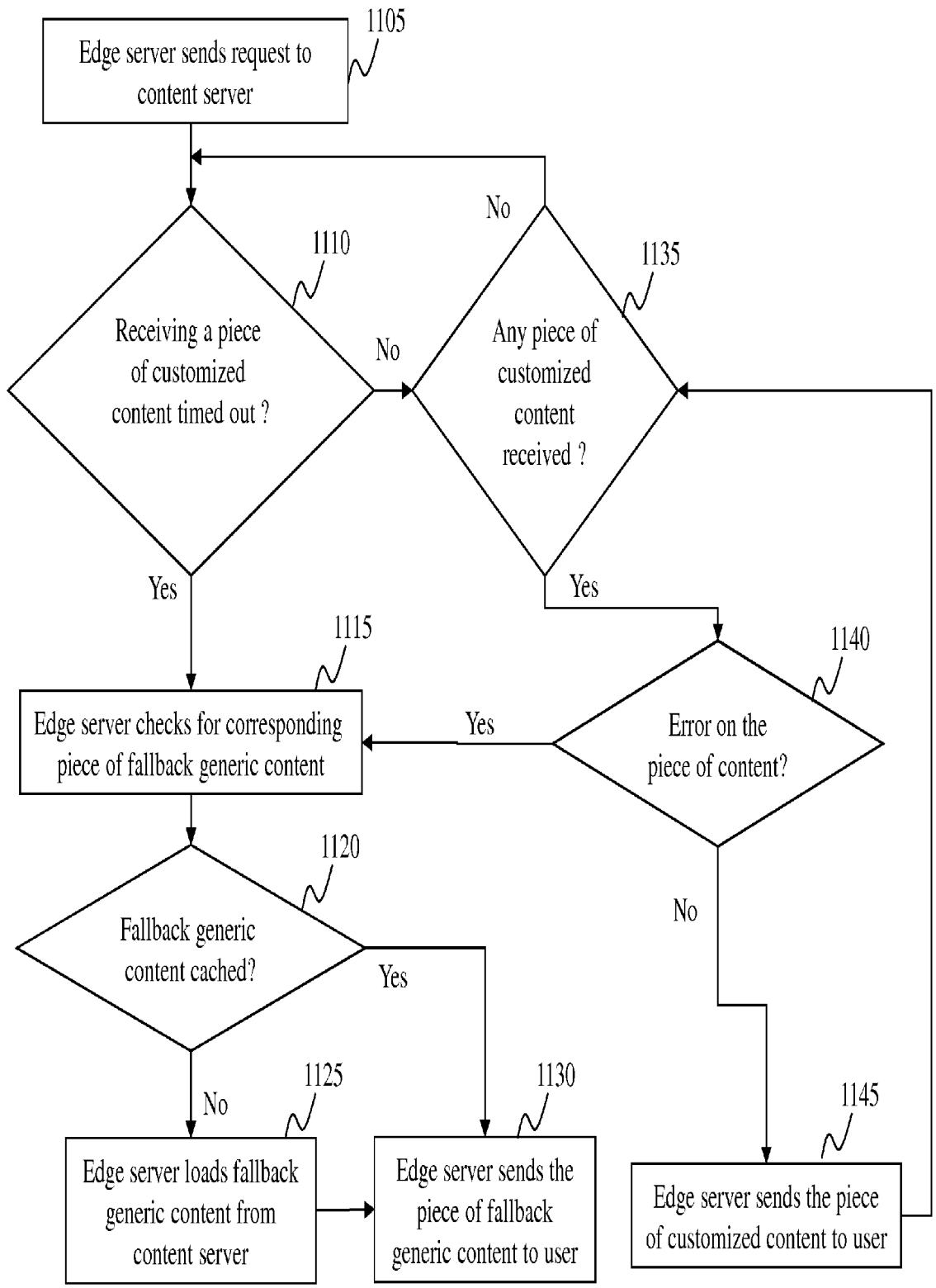

FIGS. 10-11 are flow charts for an exemplary process of delivering content to a user by an edge server, according to an embodiment of the present teaching. Starting at 1005, an edge server receives a service request for a web page including both generic and customized content items from a user. At 1010, the edge server checks whether the generic content item has been recently cached. If the cached generic content item is not available, then the method proceeds to 1015. Otherwise, the method proceeds to 1020. At 1015, the edge server sends a request to the content server for both generic content item and customized content items. At 1025, the edge server receives the requested generic content item and a set of instructions from the content server. The set of instructions, as described before, include both the first type of instruction to be executed at the client-side for content assembling and the second type of instruction to be executed at the edge server for content fetching. At 1030, the edge server caches the generic content item with an expiry time. The expiry time is used to indicate when the cached generic content item has expired. The cached content item may expire because, for example, the generic content item is news content that is rewritten once a day or is transient information such as stock prices that are updated every 15 minutes. The expiry time prevents out-of-date generic content from reaching the user. If generic content is found in the cache with an expired time, then the generic content is considered unavailable. On the other hand, at 1020, the edge server retrieves the unexpired generic content from the cache. It is understood that the corresponding set of instruction embedded in the cached generic content may retrieved as well at 1020. Eventually, at 1045, the generic content item, received from the content server or retrieved from the cache, is sent to the user with the first type of instruction.

Referring now to FIG. 11, the edge server sends a request for a web page to the content server at 1105. This is the same step as 1015 or 1035. In other words, the edge server does not send separate requests for generic and customized content items. At 1110, the edge server determines whether the request for customized content items has timed out. The edge server waits for a predetermined time from the time that the request was sent. If a response is not received within that time, then the edge server determines that the request has timed out. In one example, the timeout period is a fixed predetermined time. In another example, the timeout period varies depending on the conditions of the network. Thus, in times of congestion, the timeout period may be extended. If the request has timed out, the method proceeds to 1115. Otherwise, the method proceeds to 1135.

At 1135, the edge server determines whether any customized content item is received. If no customized content item is received, then the method repeats from 1110. Otherwise, at 1140, the edge server 140 determines whether the received customized content item has any error on it. If the received customized content item contains no error, then the method proceeds to 1145, where the edge server sends the received customized content item to the user. The method then repeats from 1135 to check whether another customized content item is received from the content server. If the received customized content item contains an error, then the method proceeds to 1115.

At 1115, the edge server checks for the fallback version of the unavailable customized content item, i.e., a corresponding cached generic content item in replace of the unavailable customized content item. The customized content item becomes unavailable either because the request for the content item has timed out or because the received customized content item has an error. In any event, the edge server determines if the cached generic content item corresponding to the requested customized content item is available at 1120. If it is not available at the edge server, then the edge server loads the fallback generic content item from the content server at 1125. Otherwise, the edge server retrieves the fallback generic content item from its cache. In any event, at 1130, the edge server sends the fallback generic content item to the user in replace of the unavailable customized content item.

Figure 12:
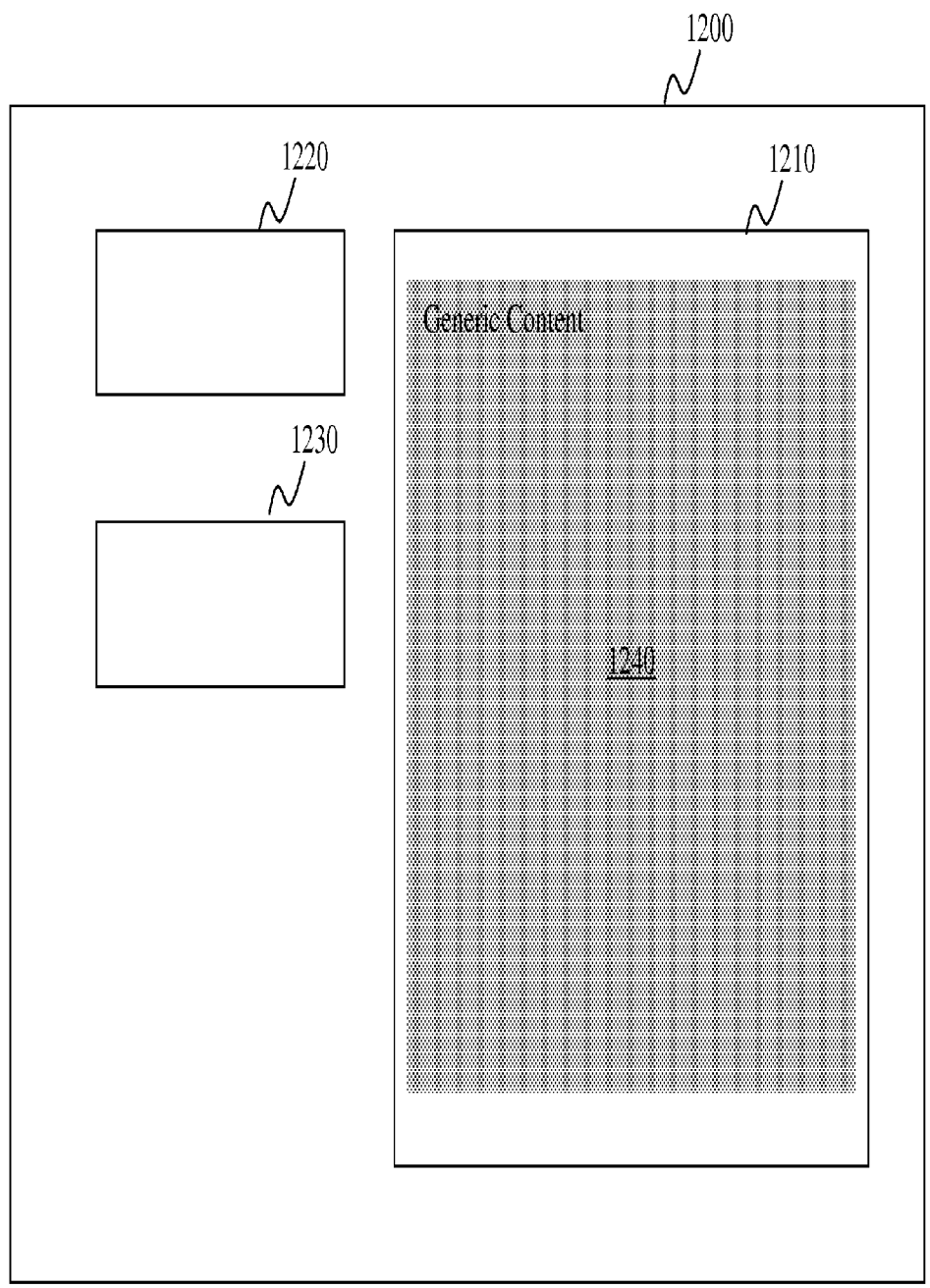
FIGS. 12-14 depict an exemplary web page assembled by generic and customized content items delivered from an edge server.
Figure 13:
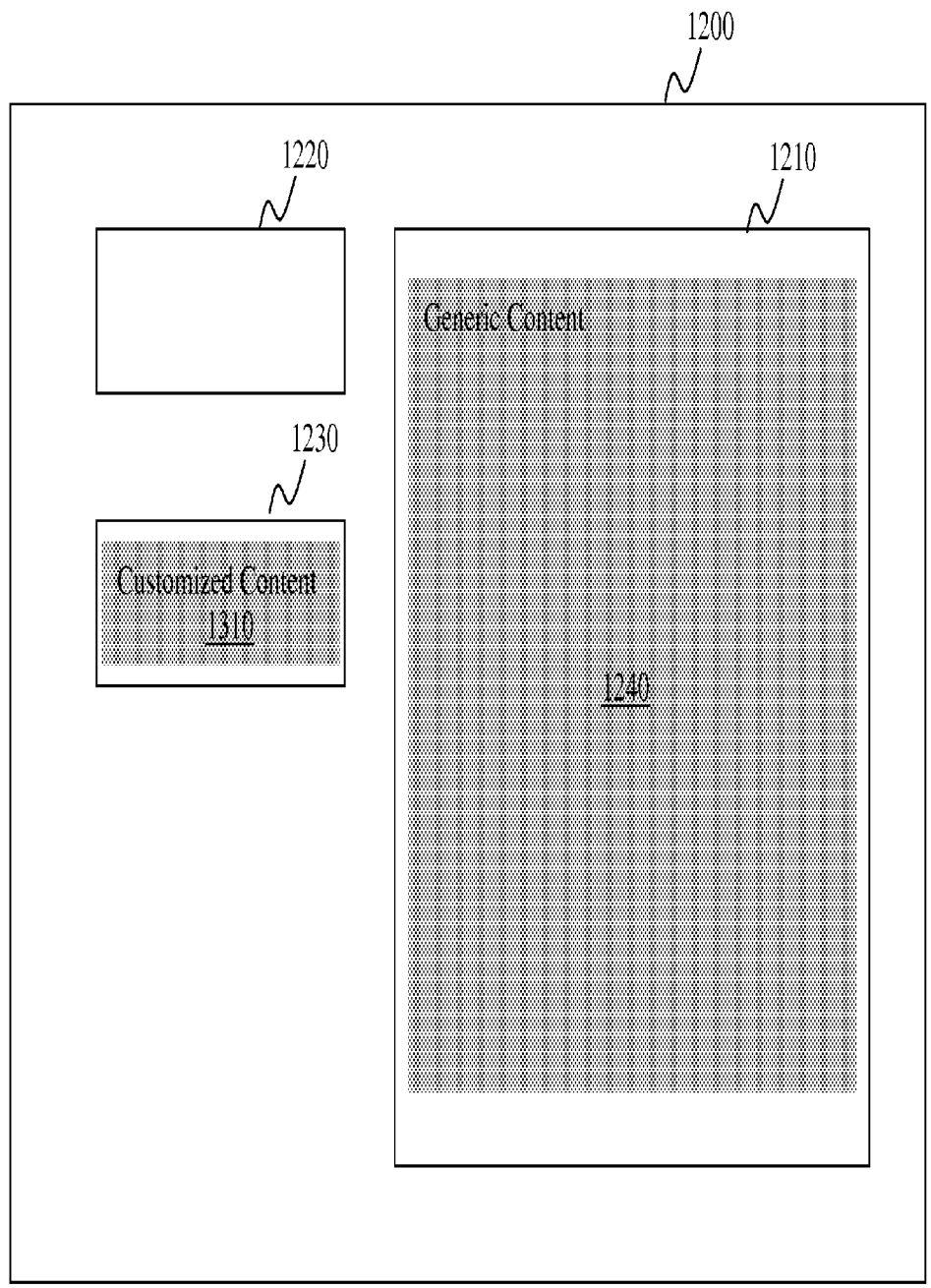
Figure 14:
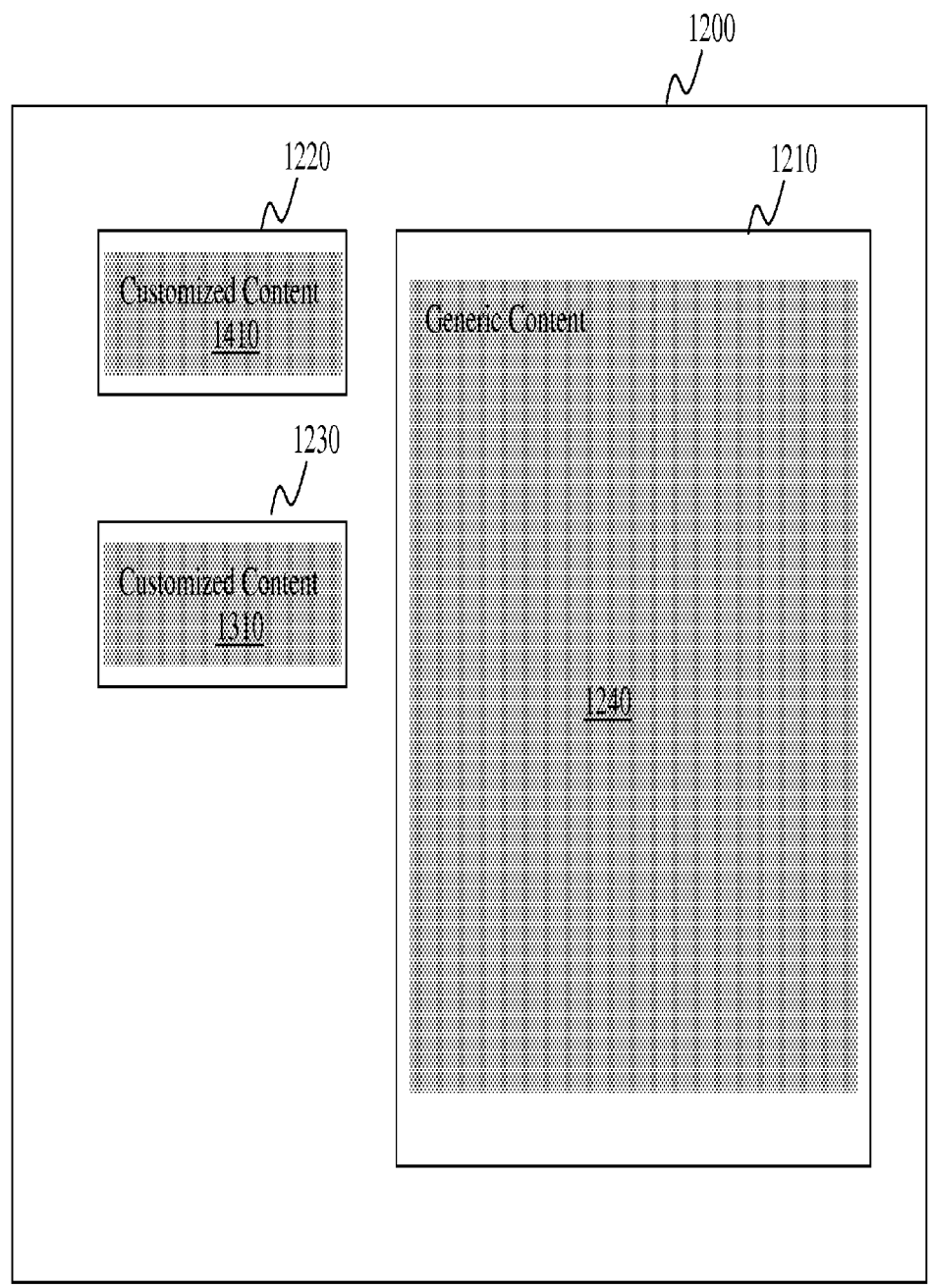

FIGS. 12-14 depict an exemplary web page assembled by generic and customized content delivered from an edge server. A web page 1200 is assembled and render at the client-side, e.g., by a web browser or any other suitable applications. The web page 1200 includes a page template (layout) having different content fields 1210, 1220, 1230 for each content item. In FIG. 12, as described before, the page template and generic content item 1240 are first received from an edge server in response to the user's request. The generic content item 1240 is then rendered at the corresponding content field 1210 of the web page 1200 without waiting for the customized content items to be received. A first type of instruction for assembling the customized content items is also received with the generic content item 1240. In FIG. 13, a first customized content item 1310 is received and immediately assembled onto the web page 1200 as instructed by the first type of instruction, e.g., a JavaScript. The first customized content item 1310 is assembled and rendered at the corresponding content field 1230 based on the page template. In FIG. 14, another customized content item 1410 is received and immediately assembled onto the web page 1200 as instructed by the first type of instruction, e.g., a JavaScript. The customized content item 1410 is assembled and rendered at the corresponding content field 1220 based on the page template. As shown in FIGS. 12-14, the method and system described in the present teaching allows serving portions of web pages (e.g., cached generic content items) from closer proximity to user requests than data centers, thereby improving latency. The method and system defer loading of more heavy-weight processing of personalized/customized components of a web page so that the user experience can begin rendering before they are complete.

Figure 15:
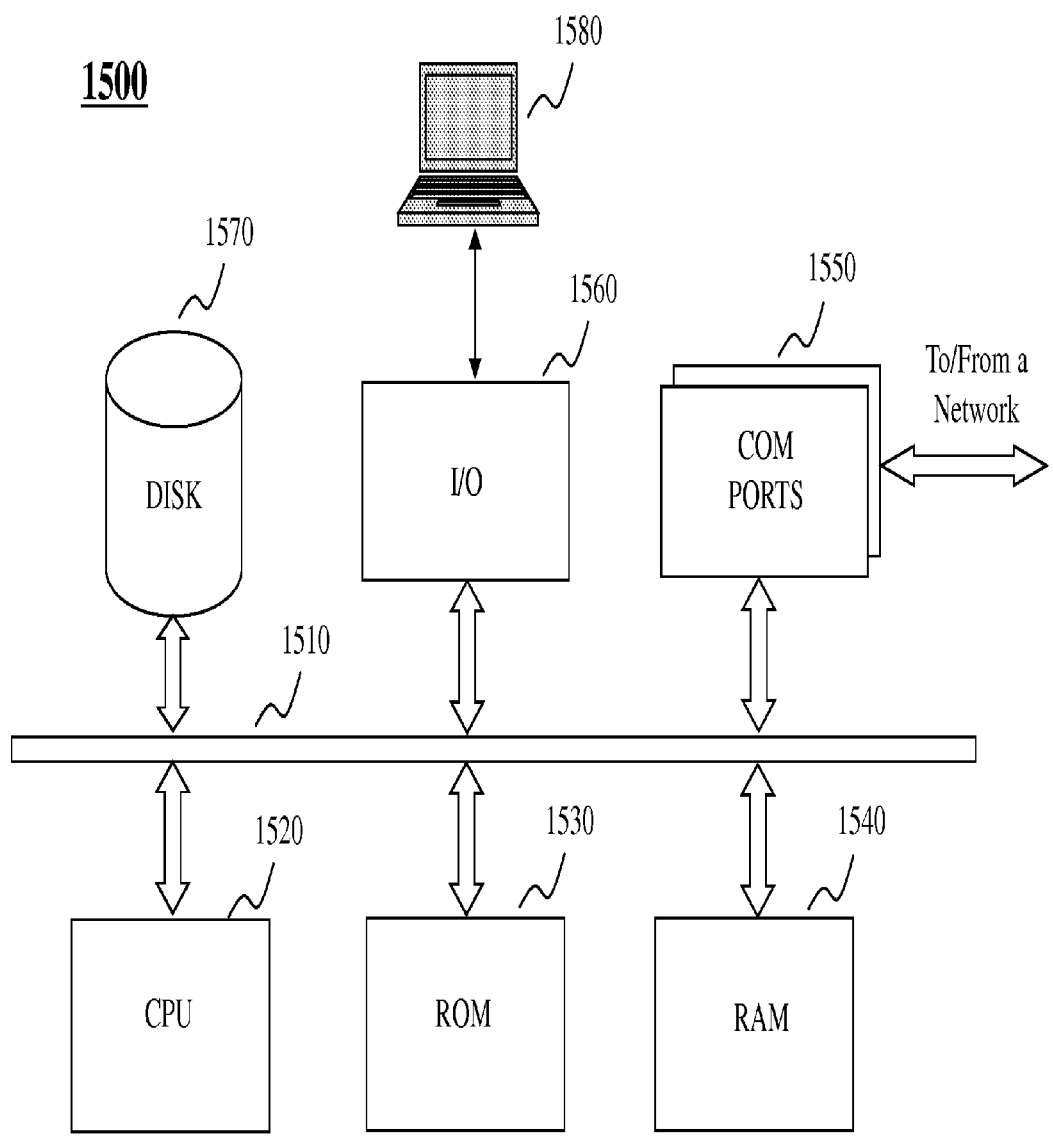
FIG. 15 depicts a general computer architecture on which the present teaching can be implemented.

FIG. 15 depicts a general computer architecture on which the present teaching can be implemented and has a functional block diagram illustration of a computer hardware platform which includes user interface elements. The computer may be a general-purpose computer or a special purpose computer. This computer 1500 can be used to implement any components of the servers as described herein. For example, the edge server 140 and the content server 315 can be implemented on a computer such as computer 1500, via its hardware, software program, firmware, or a combination thereof. Although only one such computer is shown, for convenience, the computer functions relating to edge server caching and content delivery may be implemented in a distributed fashion on a number of similar platforms, to distribute the processing load.

The computer 1500, for example, includes COM ports 1550 connected to and from a network connected thereto to facilitate data communications. The computer 1500 also includes a central processing unit (CPU) 1520, in the form of one or more processors, for executing program instructions. The exemplary computer platform includes an internal communication bus 1510, program storage and data storage of different forms, e.g., disk 1570, read only memory (ROM) 1530, or random access memory (RAM) 1540, for various data files to be processed and/or communicated by the computer, as well as possibly program instructions to be executed by the CPU. The computer 1500 also includes an I/O component 1560, supporting input/output flows between the computer and other components therein such as user interface elements 1580. The computer 1500 may also receive programming and data via network communications.

Hence, aspects of the methods of content delivery, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semi-conductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the service provider 130 or other platform into the hardware platform(s) of a computing environment or other system implementing a computing environment or similar functionalities in connection with the edge server caching and content delivery. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, systems and their components as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on at least one machine each of which has at least one processor, storage, and a communication platform connected to a network for content delivery, the method comprising:
    sending a request to an edge server for a piece of generic content and a plurality of pieces of customized content, wherein the plurality of pieces of customized content are generated by a content server;
    receiving, from the edge server, the piece of generic content with a first instruction prior to any of the plurality of pieces of the customized content being received; and
    receiving, after the piece of generic content is received, each of the plurality of pieces of customized content, wherein:
        the plurality of pieces of customized content are received sequentially by the edge server,
        each of the plurality of pieces of customized content is received, from the edge server, one at a time in a sequence by which it is to be assembled at a corresponding location on an interface for content presentation based on the first instruction, and
        a first of the plurality of pieces of customized content is associated with, according to a second instruction to the edge server, the piece of generic content as a fallback version before the first of the plurality of pieces of customized content is made available.

2. The method of claim 1, further comprising:
    assembling, based on the first instruction, the plurality of pieces of customized content in order of the sequence such that each of the plurality of pieces of customized content is rendered at the corresponding location on the interface.

3. The method of claim 1, further comprising:
    rendering the piece of generic content on the interface independently from and prior to the plurality of pieces of customized content being rendered.

4. The method of claim 1, wherein the plurality of pieces of customized content comprises at least a first piece of customized content and a second piece of customized content, sending each of the plurality of pieces of customized content comprises:
    receiving, absent any additional requests being sent to the edge server, the first piece of customized content; and
    receiving, absent any additional requests being sent to the edge server, the second piece of customized content, wherein the first piece of customized content and the second piece of customized content are provided to the edge server in response to being generated by the content server.

5. The method of claim 1, wherein the edge server is configured to:
    provide the request to the content server; and
    provide the piece of generic content and the first instruction to a client device for rendering on the interface.

6. The method of claim 1, wherein the piece of generic content is to be used as the fallback version when the first of the plurality of pieces of customized content is unavailable.

7. The method of claim 1, wherein a second piece of customized content of the plurality of pieces of customized content is associated with additional piece of generic content cached by the edge server, wherein the second instruction indicates that the additional piece of generic content is to be used as a fallback version for the second piece of customized content in response to the second piece of customized content being unavailable, wherein the method further comprises:
    retrieving, based on the second instruction, the additional piece of generic content directly from a caching unit of the edge server responsive to the second piece of customized content being unavailable.

8. A non-transitory computer-readable medium storing computer program instructions that, when executed by one or more processors, effectuate operations comprising:
    sending a request to an edge server for a piece of generic content and a plurality of pieces of customized content, wherein the plurality of pieces of customized content are generated by a content server;
    receiving, from the edge server, the piece of generic content with a first instruction prior to any of the plurality of pieces of the customized content being received; and
    receiving, after the piece of generic content is received, each of the plurality of pieces of customized content, wherein:
        the plurality of pieces of customized content are received sequentially by the edge server,
        each of the plurality of pieces of customized content is received, from the edge server, one at a time in a sequence by which it is to be assembled at a corresponding location on an interface for content presentation based on the first instruction, and
        a first of the plurality of pieces of customized content is associated with, according to a second instruction to the edge server, the piece of generic content as a fallback version before the first of the plurality of pieces of customized content is made available.

9. The non-transitory computer-readable medium of claim 8, wherein the operations further comprise:
    assembling, based on the first instruction, the plurality of pieces of customized content in order of the sequence such that each of the plurality of pieces of customized content is rendered at the corresponding location on the interface.

10. The non-transitory computer-readable medium of claim 8, wherein the operations further comprise:
    rendering the piece of generic content on the interface independently from and prior to the plurality of pieces of customized content being rendered.

11. The non-transitory computer-readable medium of claim 8, wherein the plurality of pieces of customized content comprises at least a first piece of customized content and a second piece of customized content, sending each of the plurality of pieces of customized content comprises:

receiving, absent any additional requests being sent to the edge server, the first piece of customized content; and receiving, absent any additional requests being sent to the edge server, the second piece of customized content, wherein the first piece of customized content and the second piece of customized content are provided to the edge server in response to being generated by the content server.

12. The non-transitory computer-readable medium of claim 8, wherein the edge server is configured to:

provide the request to the content server; and provide the piece of generic content and the first instruction to a client device for rendering on the interface.

13. The non-transitory computer-readable medium of claim 8, wherein the piece of generic content is to be used as the fallback version when the first of the plurality of pieces of customized content is unavailable.

14. The non-transitory computer-readable medium of claim 8, wherein a second piece of customized content of the plurality of pieces of customized content is associated with additional piece of generic content cached by the edge server, wherein the second instruction indicates that the additional piece of generic content is to be used as a fallback version for the second piece of customized content in response to the second piece of customized content being unavailable, the operations further comprise:

retrieving, based on the second instruction, the additional piece of generic content directly from a caching unit of the edge server responsive to the second piece of customized content being unavailable.

15. A device, comprising:

memory storing computer program instructions; and one or more processors that, when executing the computer program instructions, effectuate operations comprising:

sending a request to an edge server for a piece of generic content and a plurality of pieces of customized content, wherein the plurality of pieces of customized content are generated by a content server;

receiving, from the edge server, the piece of generic content with a first instruction prior to any of the plurality of pieces of the customized content being received; and receiving, after the piece of generic content is received, each of the plurality of pieces of customized content, wherein:

the plurality of pieces of customized content are received sequentially by the edge server, each of the plurality of pieces of customized content is received, from the edge server, one at a time in a sequence by which it is to be assembled at a corresponding location on an interface for content presentation based on the first instruction, and a first of the plurality of pieces of customized content is associated with, according to a second instruction to the edge server, the piece of generic content as a fallback version before the first of the plurality of pieces of customized content is made available.

16. The device of claim 15, wherein the operations further comprise:

assembling, based on the first instruction, the plurality of pieces of customized content in order of the sequence such that each of the plurality of pieces of customized content is rendered at the corresponding location on the interface.

17. The device of claim 15, wherein the operations further comprise:

rendering the piece of generic content on the interface independently from and prior to the plurality of pieces of customized content being rendered.

18. The device of claim 15, wherein the plurality of pieces of customized content comprises at least a first piece of customized content and a second piece of customized content, sending each of the plurality of pieces of customized content comprises:

receiving, absent any additional requests being sent to the edge server, the first piece of customized content; and receiving, absent any additional requests being sent to the edge server, the second piece of customized content, wherein the first piece of customized content and the second piece of customized content are provided to the edge server in response to being generated by the content server.

19. The device of claim 15, wherein the piece of generic content is to be used as the fallback version when the first of the plurality of pieces of customized content is unavailable.

20. The device of claim 15, wherein a second piece of customized content of the plurality of pieces of customized content is associated with additional piece of generic content cached by the edge server, wherein the second instruction indicates that the additional piece of generic content is to be used as a fallback version for the second piece of customized content in response to the second piece of customized content being unavailable, wherein the operations further comprise:

retrieving, based on the second instruction, the additional piece of generic content directly from a caching unit of the edge server responsive to the second piece of customized content being unavailable.

* * * * *